Dec. 23, 1958    H. E. LOWE, JR    2,865,326
BIRD FEEDERS
Filed Aug. 15, 1957    3 Sheets-Sheet 1
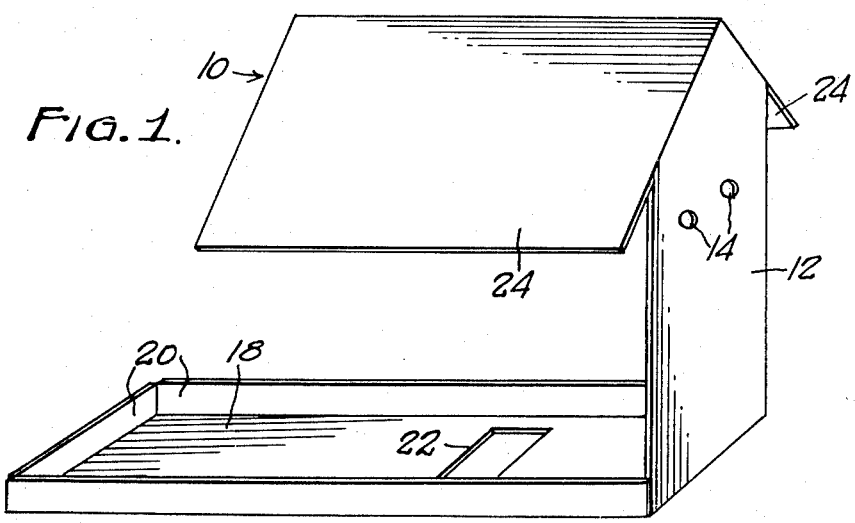
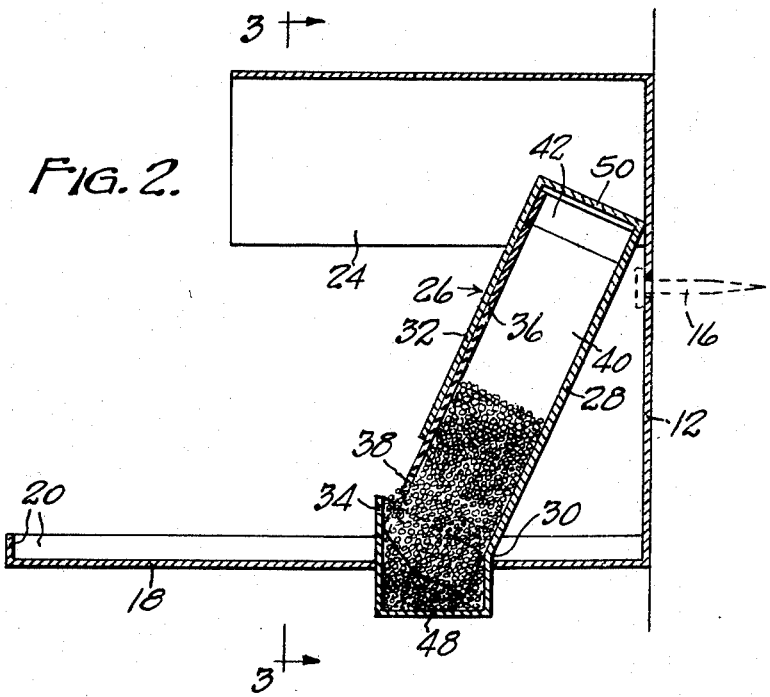
INVENTOR.
HENRY EDWARD LOWE, JR.
BY
Eugene C. Knoblock
ATTORNEY.

Dec. 23, 1958 — H. E. LOWE, JR — 2,865,326
BIRD FEEDERS
Filed Aug. 15, 1957 — 3 Sheets-Sheet 2
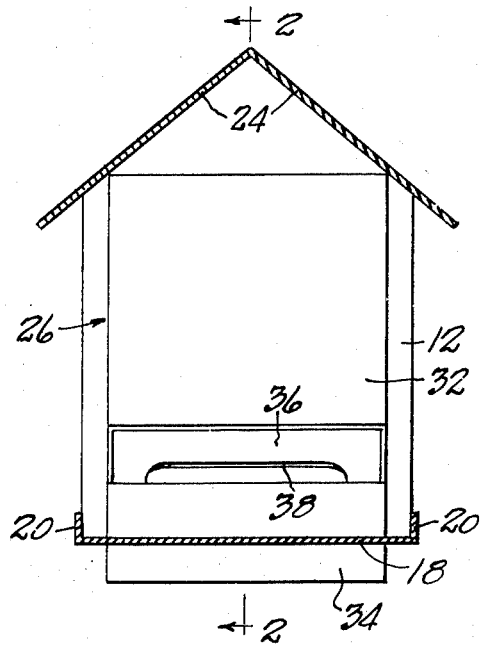
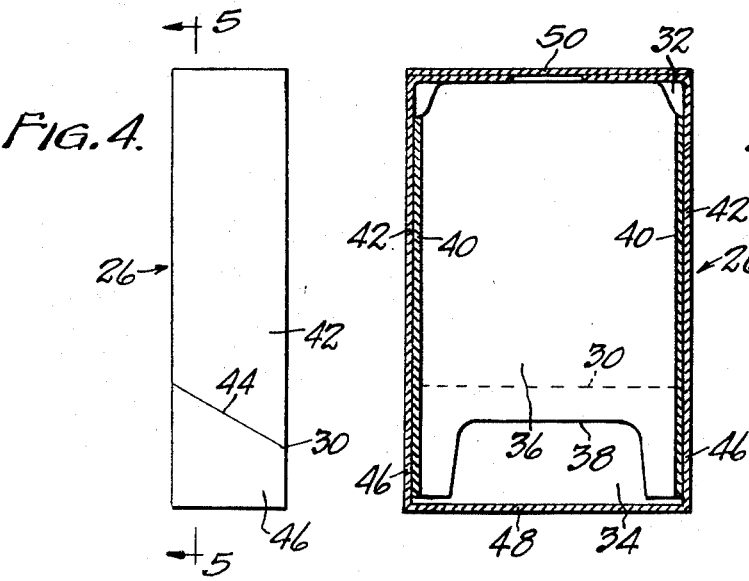
INVENTOR.
HENRY EDWARD LOWE, JR.
BY
Eugene C. Knoblock
ATTORNEY.

Dec. 23, 1958  H. E. LOWE, JR  2,865,326
BIRD FEEDERS
Filed Aug. 15, 1957  3 Sheets-Sheet 3
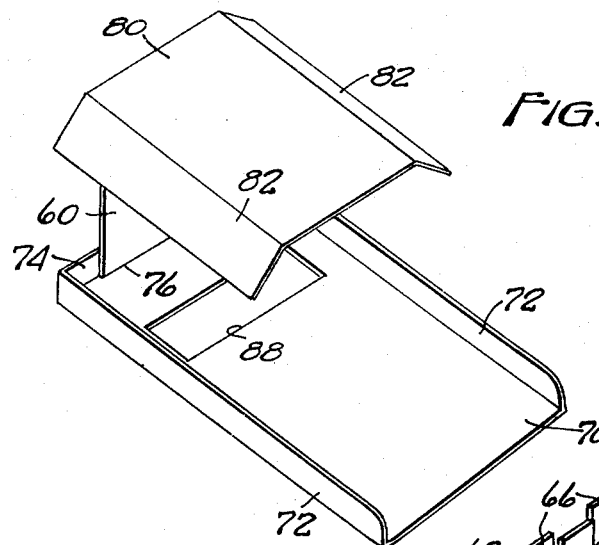
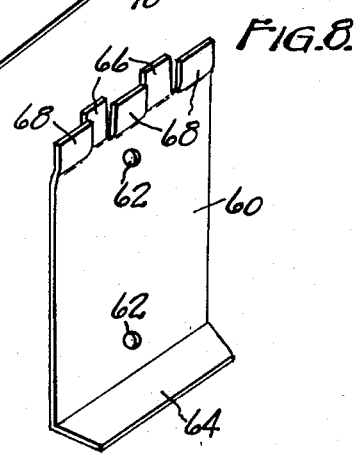
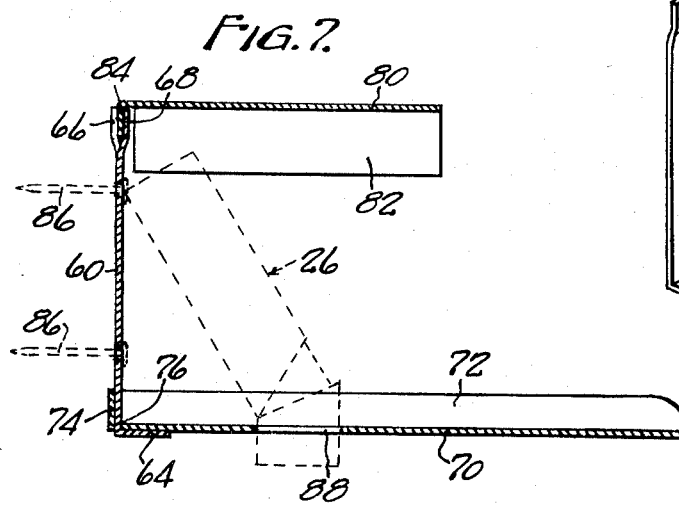
INVENTOR.
HENRY EDWARD LOWE, JR.
BY
Eugene C. Knoblock
ATTORNEY.

United States Patent Office 2,865,326
Patented Dec. 23, 1958

2,865,326

BIRD FEEDERS

Henry Edward Lowe, Jr., Cassopolis, Mich.

Application August 15, 1957, Serial No. 678,333

10 Claims. (Cl. 119—52)

This invention relates to improvements in bird feeders.

The primary object of this invention is to provide a novel, simple and inexpensive device of this character having a novel supporting frame detachably supporting a container for granular bird food in such a manner as to provide a tray and a self-feeding reservoir for the bird food when the container is opened and to accommodate ready access of birds to the bird food, without spilling thereof or subjecting the bird food to objectionable exposure to the weather, or to broadcasting thereof by the activities of birds therearound or by gusts of wind.

A further object is to provide a device of this character comprising a carrier detachably mounting a container having pivotally connected portions, said container being supported without requiring the use of securing means and being readily mounted and removed without requiring disassembly of the supporting means.

Other objects will be apparent from the following specification.

In the drawings:

Fig. 1 is a perspective view of a support used in the device;

Fig. 2 is a vertical longitudinal sectional view taken on line 2—2 of Fig. 3, and illustrating in section a container for bird food mounted therein;

Fig. 3 is a transverse vertical sectional view taken on line 3—3 of Fig. 2 and illustrating a container mounted therein;

Fig. 4 is an end view of a container of the type used in the device;

Fig. 5 is a transverse sectional view of the container taken on line 5—5 of Fig. 4;

Fig. 6 is a perspective view of another form of support used with the device;

Fig. 7 is a vertical longitudinal sectional view of the construction illustrated in Fig. 6, and similar to the view shown in Fig. 2, wherein the container is illustrated in dotted lines operatively mounted in the support;

Fig. 8 is a perspective view of a part of the device illustrated in Fig. 6.

Referring to the drawings, and particularly to Figs. 1 to 3 which illustrate one embodiment of the invention, the numeral 10 designates a support or carrier unit which preferably is formed of metal although it may be formed of wood, plastic or any other material found suitable. The support or carrier 10 includes a substantially upright wall 12 which preferably has one or more openings 14 therein, by means of which the member 12 may be secured to a support by nails, screws or other securing means 16. A bottom plate 18 extends substantially perpendicularly from the plate 12 and is preferably provided with upturned marginal flanges 20 of shallow dimensions adapted to outline a platform within which granular bird food, such as seeds, may be confined. The base plate 18 has an aperture 22 formed therein intermediate its ends and preferably positioned closer to the wall 12 than to the opposite end of the base 18. The opening 22 is preferably rectangular and its dimensions will preferably be less than the width of the base plate 18, and its major dimension will extend transverse of the plate 18. At its upper end the plate 12 carries a cover or roof member 24 extending forwardly therefrom and preferably has oppositely inclined parts, as best seen in Fig. 3. The total width of the roof member 24 will preferably be greater than the width of the base plate 18, and the parts will be centered vertically with relation to each other, as seen in Fig. 3. The length of the roof members 24 will preferably be somewhat less than the length of the bottom plate 18, as best seen in Fig. 2.

A container 26 is mounted in the opening 22 of the base 18 and preferably will be a paper container of the type having hinged opposite end portions and now commonly used for packaging cigarettes. The container has a side wall 28 preferably formed of a single thickness of thin paperboard material which is scored transversely thereof at 30. A second side wall normally extends parallel to side wall 28 and is composed of a pair of panels 32 and 34 which are substantially coplanar in closed position, and an inner panel 36 preferably secured to and lining the face of the panel 32 and projecting therebelow to abut the inner face of the panel 34 in its closed position. The inner panel 36 is cut away at 38 at its lower end at a level below the bottom edge of the panel 32. Wings or panels 40 project from the inner panel 36 and are secured to the upper portions 42 of outer container end walls which are cut diagonally at 44 to abut the upper oblique edges of lower outer container end wall portions 46. A bottom panel 48 interconnects the side panels 30, 34 and the lower end panels 46. A top panel 50 interconnects the upper ends of the panels 28, 32 and 42, and may be of multiple thickness if desired.

Containers of this character are usually employed with the end 48 thereof uppermost so that their position as described above is inverted compared to the normal position of the parts. The dimensions in the opening 22 are preferably such as to snugly receive therein the lowermost portion of the container, as illustrated in Figs. 2 and 3. The container will be inserted in the opening to the depth substantially at the fold or score line 30 of the wall 28 thereof, as seen in Fig. 2, and after insertion thereof in this position the uppermost part of the container is pivoted about the score line 30 to an inclined position, as illustrated in Fig. 2, with one upper edge bearing against the rear wall 12. The roof members 24 will be so proportioned and spaced relative to support plate 18 that, when the upper part of the container has been tilted, at least a part of the uppermost edge thereof will engage the roof members 24 to be held or supported thereby with a slight bind or frictional fit which will insure against dislodgment of the container if heavy winds occur.

It will be noted from Figs. 2 and 4 that the upper edges 44 of the inner portions 46 of end walls 42 extend diagonally from the score line 30 of the wall 28 so that the foremost wall 34 and the portions of the end walls 46 adjacent thereto will extend at a level substantially above and spaced from the bottom panel 8. In the inclined or open position of the upper part of the container, the opening 38 is exposed above the top edge of the front tray wall 34, as best seen in Fig. 3, so that the birds have access through the opening 38 to the bird food within the tray part of the container. Furthermore, it will be apparent that the inclined upper part of the container forms a reservoir from which granular material may flow to maintain a substantially constant filled condition of the lower tray portion of the device. The opening at 38 will preferably be sufficiently large that when the upper portion is empty, the birds may insert their beaks therethrough sufficiently to withdraw food from the tray portion of the device formed by the parts 34, 46, 28 and 48. The spacing of the aperture 22 of the support or carrier from the rear wall 12 will determine the angle at which the upper part of the container is held and the size of the opening 38 and, upon proper positioning of the container within the device, it will be opened to the proper degree each time that it is introduced or mounted in the device. The lower ends of the liner panels 40 at the ends of the device project into the tray, as seen in Fig. 2, and serve to confine the granular material against spillage at the inclined edges 44 of the tray.

The roof preferably projects a substantial distance beyond the aperture 22 so as to form a protection for the container and its contents during inclement weather. At the same time the base 18 projects sufficiently to provide a perch for a bird, even a large bird, such as a robin or woodpecker, and therefore renders the device suitable for feeding substantially all birds of the song bird category. Because of the fact that the containers used in this device are widely used for the packaging of cigarettes and other articles, containers are readily available, and the user can fill such container with bird seed after cigarettes have been used therefrom, and can insert the same in the support unit without altering the container or support unit. Thus the containers may be replaced frequently, so that soaking thereof by water is no problem inasmuch as the container is readily replaced without cost to the user who already has the containers as a result of the purchase of cigarettes.

Another embodiment of the invention is illustrated in Figs. 6, 7 and 8 and entails a different form of carrier designed for collapsibility to accommodate compact packaging and shipment thereof. In this construction the back panel 60 is preferably formed of rigid sheet material, such as sheet metal or plastic sheet material, and has a plurality of nail holes 62 formed therein. At its lower end the back panel 60 has a rigid flange 64 bent therefrom substantially perpendicularly, said flange preferably having tapered end edges. The upper end of the plate 60 is provided with a plurality of longitudinal spaced kerfs therein defining a plurality of tongues which are arranged in two sets, with the tongues of each set coplanar and offset from the tongues of the other set. Thus two spaced tongues 66 may constitute one set, and tongues 68 spaced by the tongues 66 and located in planes spaced forwardly from the planes of the tongues 66 constitute the other set.

A bottom panel 70 formed of rigid material preferably has longitudinal side flanges 72 and a transverse end flange 74 bent upwardly therefrom. A slot 76 is formed in the base 70 adjacent to the transverse flange 74 and is of a width equal to the width of the back plate 60. Slot 76 is adapted to receive back plate 60 with the flange 74 bearing against the back plate, and the flange 64 of the back plate supporting the base plate 70, as best seen in Fig. 7. Thus the back plate 70 is effectively supported upon the upright member 60 in a detachable manner without requiring the use of securing members.

A roof or top member 80 formed of rigid sheet material, preferably wider than the base plate 70, may have flanges 82 bent angularly downwardly therefrom for water-shedding purposes. A flange 84 is bent downwardly from the plate 80 at the rear part thereof and is adapted to fit between the tongues 66 and 68 for fixed support by the member 60.

The device shown in Figs. 6, 7 and 8 is readily erected and is anchored to a support by the use of nails 86 passing through the apertures 62 of the back plate 60. The base plate 70 has aperture 88 therein to receive container 26 of the character previously described. This container fits in the carrier shown in Figs. 6, 7 and 8 in the same manner described above, and the same advantages and uses of the device are provided by this embodiment of the invention.

While the preferred embodiments of the invention have been illustrated and described, it will be understood that changes in the construction may be made within the scope of the appended claims without departing from the spirit of the invention.

I claim:

1. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container.

2. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, said support including a roof portion spaced above said plate portion and overlying said container.

3. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, said support including a roof portion spaced above said plate portion and overlying said container, the spacing between said roof and plate portions being substantially equal to the diagonal dimension of said tilted container portion to wedge the same in tilted position.

4. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, and means detachably connecting said upright and plate portions.

5. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, a flange extending substantially perpendicularly from the lower end of said upright, said plate having an upturned flange and an elongated upright receiving slot, the flange of each support part engaging the other support part when said upright fits in said slot.

6. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, said support including a roof portion spaced above said plate portion and overlying said container, and means detachably connecting said upright and roof portions.

7. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, said support including a roof portion spaced above said plate portion and overlying said container, said upright portion including two substantially parallel sets of spaced substantially coplanar rigid tongues, and a flange downturned at one end of said roof portion and detachably retained between said sets of tongues.

8. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, said container being formed of paper stock scored at one wall to define the pivotal connection between said container end parts.

9. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, the adjacent edges of the opposite end portions of said container lying in a plane parallel to the pivot therebetween and oblique relative to the container walls adjacent to and substantially perpendicular to said pivot.

10. A bird feeder comprising a support having a substantially upright mounting portion and a substantially horizontal plate portion having an opening therein spaced from said upright, and a container having pivotally connected communicating opposite end portions, one of said container portions being comparatively shallow and fitting snugly in said plate opening to define a tray, the other container portion projecting above said plate and being supported by said upright in tilted position to define a container opening between said container portions for access to the contents of the container, said container being formed of paper stock scored at one wall in the plane of separation of said parts, and inner side panels carried by one container portion perpendicular to said score and projecting into the other container portion.

References Cited in the file of this patent

UNITED STATES PATENTS

| 1,791,956 | Cowles | Feb. 10, 1931 |
| 2,320,289 | Marx | May 25, 1943 |
| 2,361,597 | Buttery | Oct. 31, 1944 |
| 2,361,659 | Smith | Oct. 31, 1944 |
| 2,796,212 | Graybill | June 18, 1957 |

FOREIGN PATENTS

| 812,221 | France | Jan. 27, 1937 |